US011036927B1

(12) United States Patent
Williams

(10) Patent No.: US 11,036,927 B1
(45) Date of Patent: Jun. 15, 2021

(54) RELATIVE POSITIONAL PARSING OF DOCUMENTS USING TREES

(71) Applicant: INTUIT INC., Mountain View, CA (US)

(72) Inventor: Kenneth Williams, Mountain View, CA (US)

(73) Assignee: INTUIT INC., Mountain View, CA (US)

( * ) Notice: Subject to any disclaimer, the term of this patent is extended or adjusted under 35 U.S.C. 154(b) by 97 days.

(21) Appl. No.: 16/051,663

(22) Filed: Aug. 1, 2018

(51) Int. Cl.
*G06F 40/174* (2020.01)
*G06F 16/93* (2019.01)
*G06F 16/901* (2019.01)

(52) U.S. Cl.
CPC ........ *G06F 40/174* (2020.01); *G06F 16/9027* (2019.01); *G06F 16/93* (2019.01)

(58) Field of Classification Search
CPC ..................................................... G06F 17/243
USPC .......................................................... 715/224
See application file for complete search history.

(56) References Cited

U.S. PATENT DOCUMENTS

| | | | | |
|---|---|---|---|---|
| 2007/0171473 A1* | 7/2007 | Iwasaki | ............. | G06F 16/93 358/1.18 |
| 2012/0109792 A1* | 5/2012 | Eftekhari | ............. | G06F 21/31 705/31 |
| 2013/0290270 A1* | 10/2013 | Pareek | ............. | G06F 16/93 707/687 |
| 2013/0318426 A1* | 11/2013 | Shu | ............. | G06K 9/00469 715/226 |
| 2015/0058374 A1* | 2/2015 | Golubev | ............. | G06F 16/93 707/769 |
| 2015/0117721 A1* | 4/2015 | Rhodes | ............. | G06Q 10/10 382/112 |
| 2019/0026577 A1* | 1/2019 | Hall | ............. | G06K 9/00456 |
| 2019/0026579 A1* | 1/2019 | Hall | ............. | G06K 9/03 |

OTHER PUBLICATIONS

Diligenti, Michelangelo, Paolo Frasconi, and Marco Gori. "Hidden tree Markov models for document image classification." IEEE Transactions on pattern analysis and machine intelligence 25, No. 4 (2003): 519-523. (Year: 2003).*

* cited by examiner

*Primary Examiner* — Frank D Mills
(74) *Attorney, Agent, or Firm* — Patterson + Sheridan LLP

(57) ABSTRACT

Certain aspects of the present disclosure provide techniques for improved retrieval of data from documents. Embodiments include receiving, from a user, a definition of a document region, wherein the definition comprises coordinates relative to a location on a document page. Embodiments include receiving, from the user, an identifier associated with the document region. Embodiments include receiving a document comprising one or more elements. The document may not support queries for the one or more elements. Embodiments include building a tree based on the document, the tree including one or more elements with element coordinates. Embodiments include retrieving an item of data associated with the identifier by determining that the element coordinates of an element in the tree are within the document region associated with the identifier and retrieving the element as the item of data. Embodiments include using the item of data to perform an action.

21 Claims, 6 Drawing Sheets

OFFICIAL FORM

USDD
PO BOX 11111
SAN DIEGO, CA 92122

ABC CORP

123 BUSINESS LN
DALLAS, TX 75214

WITHHELD FOR: June 2018

| | |
|---|---|
| Account # | 000001 |
| Frequency | Monthly |
| Due | 07/15/2018 |
| Total Wages | 3197.00 |
| Tax Withheld | 62.96 |
| Total Due | 62.96 |

USER INTERFACE 200

FIG. 2

RELATIVE POSITIONAL PARSING OF DOCUMENTS USING TREES

INTRODUCTION

Aspects of the present disclosure relate to improved techniques for retrieving data from documents. In particular, embodiments described herein involve relative positional parsing of documents via trees based on user-defined regions.

BACKGROUND

Applications often provide services that involve the extraction of data from documents. For example, a financial services application may extract values from a document by querying the document, and may use the values in providing services related to financial management, such as tax preparation. However, not all documents support queries. For example, some types of portable document format (PDF) documents may be "flat" documents that do not contain form fields, comments, interactive elements, or other data that would allow the documents to be queried for particular data.

In cases where a document does not support queries, data is often manually extracted from the document, which can be an inconvenient, time-consuming, and error-prone process. While there are techniques for identifying text in images and flat documents, such as optical character recognition (OCR) processes, these techniques generally result in raw text without any data about individual items of data within the text. Thus, such techniques do not provide an effective method of querying the text for a particular item of data. Furthermore, the location of a particular item of data may vary slightly across a plurality of documents of the same type, even by fractions of inches. These variations, though slight, may cause certain existing techniques for data extraction from documents to fail. For example, techniques that rely on the exact location of an item of data remaining constant across a plurality of documents will not succeed if the location of the item of data varies. As such, there is a need in the art for improved techniques of extracting data from documents that cannot be queried.

BRIEF SUMMARY

Certain embodiments provide a method for improved retrieval of data from documents. The method generally includes receiving, from a user, a definition of a document region, wherein the definition comprises coordinates relative to a location on a document page; receiving, from the user, an identifier associated with the document region; receiving a document comprising one or more elements, wherein the document is a flat document that does not support queries for the one or more elements; building a tree based on the document, wherein the tree comprises the one or more elements, and wherein each element of the one or more elements is associated in the tree with element coordinates defining a location of the element relative to a location on a page of the document; retrieving an item of data associated with the identifier by: determining that the element coordinates of an element of the one or more elements in the tree are within the document region associated with the identifier; and retrieving the element as the item of data; and using the item of data to perform an action.

Other embodiments provide a non-transitory computer-readable medium comprising instructions that, when executed by one or more processors, cause the one or more processors to perform a method for improved retrieval of data from documents. The method generally includes receiving, from a user, a definition of a document region, wherein the definition comprises coordinates relative to a location on a document page; receiving, from the user, an identifier associated with the document region; receiving a document comprising one or more elements, wherein the document is a flat document that does not support queries for the one or more elements; building a tree based on the document, wherein the tree comprises the one or more elements, and wherein each element of the one or more elements is associated in the tree with element coordinates defining a location of the element relative to a location on a page of the document; retrieving an item of data associated with the identifier by: determining that the element coordinates of an element of the one or more elements in the tree are within the document region associated with the identifier; and retrieving the element as the item of data; and using the item of data to perform an action.

Other embodiments provide a system comprising one or more processors and a non-transitory computer-readable medium comprising instructions that, when executed by the one or more processors, cause the one or more processors to perform a method for improved retrieval of data from documents. The method generally includes receiving, from a user, a definition of a document region, wherein the definition comprises coordinates relative to a location on a document page; receiving, from the user, an identifier associated with the document region; receiving a document comprising one or more elements, wherein the document is a flat document that does not support queries for the one or more elements; building a tree based on the document, wherein the tree comprises the one or more elements, and wherein each element of the one or more elements is associated in the tree with element coordinates defining a location of the element relative to a location on a page of the document; retrieving an item of data associated with the identifier by: determining that the element coordinates of an element of the one or more elements in the tree are within the document region associated with the identifier; and retrieving the element as the item of data; and using the item of data to perform an action.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

FIG. 2 depicts an example user interface related to improved retrieval of data from documents.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
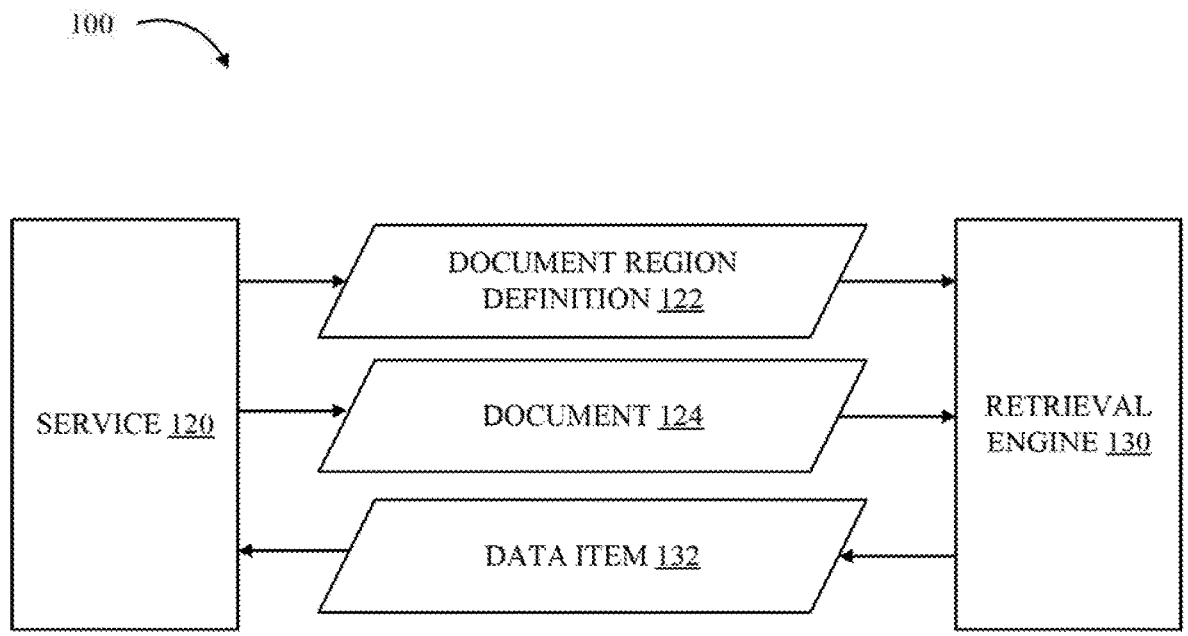
FIG. 1 depicts an example of improved retrieval of data from documents.

Aspects of the present disclosure provide apparatuses, methods, processing systems, and computer readable mediums for improving a user experience of an application.

Computing applications often make use of data retrieved from documents in providing services to users. For example, certain financial services applications make use of data from financial documents in order to provide financial services, such as financial management or tax preparation. Some types of documents support queries for data within the document, such as documents with metadata or index data that allows particular items of data to be queried within the document. However, some types of documents do not allow for data within the documents to be easily retrieved. For example, some documents do not support queries for specific items of data within the documents. Some types of portable document format (PDF) documents, for instance, are considered "flat" (e.g., having no form fields, comments, or other interactive elements), and therefore cannot be queried. Other types of documents may contain only text data without any information describing the text data (e.g., having no metadata). Furthermore, some types of documents (e.g., documents that are automatically generated by an application) may not conform to the same structure due to variable elements of the documents, and items of data may appear in varying locations, lengths, and positions on a page of the document. Accordingly, techniques described herein are directed in particular to efficient retrieval of data from documents that do not otherwise support queries for particular items of data within the documents.

Generally, an element refers to cluster of text in a document, such as an address or account number, while a data item or item of data refers to a particular item that is being retrieved from a document, and may or may not correspond to an element in the document.

In certain embodiments of the present disclosure, a definition of a document region comprising coordinates relative to a location on a document page is received, such as from a user via a user interface. In one example, the definition includes X and Y coordinates (e.g., defined in pixels measured from the bottom left corner of the page) of both the bottom left corner and the top right corner of a rectangular region within a page of the document. An identifier is also received, such as from the user via the user interface, in association with the region definition for identifying the contents of the region. For example, the region may be associated with a customer address, and the identifier may be "customer address".

The definition of the document region and the associated identifier may be received from a user (e.g., an agent or employee of a company that provides financial services applications). For example, particular items of data (e.g., customer address, date, account number, total wages, amount of tax withheld, total tax due) may need to be retrieved from a plurality of documents of a particular type (e.g., tax forms from a particular local municipality associated with a plurality of customers) to be used in further processing by an application, such as populating other documents based on the items of data. The plurality of documents may be "flat" documents that do not support queries for the items of data within the documents. Furthermore, the plurality of documents may have variations in the positioning of the items of data within pages of the document. For instance, the location of a particular item of data may vary by fractions of inches among the plurality of documents. In one example, the plurality of documents comprise a plurality of system-generated tax forms associated with a particular local municipality, each of the plurality of documents being associated with a different customer. Because the items of data for each customer may have different lengths and structures (e.g., some customers have addresses that are longer than those of other customers), the items of data may not always fall in the same exact location on each of the plurality of documents. Accordingly, the agent may provide a definition of a region that encompasses a particular item of data across the plurality of documents as well as provide an identifier of the item of data in association with the definition.

In one embodiment, a user interface allows for the definition of the region to be provided, such as through drag-and-drop techniques. For example, the agent may launch the user interface, which may show a sample document of the plurality of documents, and the agent may click and drag to define a box within a page of the document. Coordinates of the bottom left corner and top right corner of the box defined by the agent are stored as the region definition. In certain embodiments, the region definition is stored in association with an identifier for the region that is provided by the agent (e.g., by typing the identifier into a user interface component). The agent may choose the region based on knowledge that the particular item of data falls within the region in each of the plurality of documents (e.g., the region encompasses all or most variations of the location of the item of data across the plurality of documents). In other embodiments, the definition of the region is hard-coded for a certain document type, such as a tax form for a particular local municipality for a particular year (e.g., by a software developer familiar with the certain document type).

The definition of the region is then used to retrieve the item of data (e.g., based on the identifier, which is associated with the item of data) from each of the plurality of documents so that the item of data does not have to be manually retrieved from each of the plurality of documents. In some embodiments, a tree is built for each document of the plurality of documents, the tree comprising each element (e.g., word, line, value, paragraph, and/or other subsets of the text in the document) from the document associated with exact coordinates of the element's location on a page of the document. For example, the tree may be built for a document by converting the document to an extensible markup language (XML) tree. Various tools for this conversion, such as PDFQuery and PyPDF, may be used. For example, in some cases an element tree (e.g., a tree comprising all of the elements, such as words, lines, values, or paragraphs in the document) is built based on a document by extracting clusters of text (e.g., words that fall within a certain distance from one another) from the document and storing each cluster of text as an element in the tree along with location data of the element (e.g., coordinates of the cluster of text on the page, such as X and Y values representing numbers of pixels from the bottom left corner of the page to the bottom left corner and/or top right corner of the cluster of text). The element tree comprises all of the text data from the document, page by page, converted into the form of elements (e.g., based on clustering) associated with location data that identifies the exact coordinates of the elements relative to a location on the page.

Once a tree is built for a document of the plurality of documents, the tree is used to retrieve the item of data from the document based on the definition of the region. For example, any elements in the tree that are associated with coordinates that fall within the coordinates of the region (e.g., within the box defined by the agent) are retrieved as the item of data. Thus, even though the item of data may have slight variations in location across different documents of the plurality of documents, the definition of the region allows the item of data to be automatically retrieved from all of the plurality of documents, as the region may be defined to encompass all possible locations of the item of data.

In certain embodiments, pattern matching may be used to validate the item of data. For example, if a document type has a high degree of variability in the location of the item of data (e.g., a particular system-generated form is known to produce significant variations), it may be beneficial to validate the item of data retrieved from the document to ensure that it is accurate before taking further action based on the item of data. Pattern matching may involve comparing the item of data to a pattern to which the item of data is expected to conform. For example, an address may be expected to include a street address (e.g., a number followed by text), a city name (e.g., one to three words), a state name or abbreviation (e.g., two characters), and a zip code (e.g., five or more numbers). If the item of data does not match the pattern, then the item of data may be determined to be invalid. Otherwise, if the item of data matches the pattern, it may be determined to be valid.

Once retrieved from the document (and, in some instance, once validated), the item of data may be used for a variety of useful purposes within the application. For example, the item of data may be used to populate a field of a different document, such as a state tax form for reporting tax withholdings for the customer associated with the document. Business rules (e.g., related to tax law), for instance, can be used to make tax-related determinations based on the item of data for the purposes of populating a tax form that is separate from the document. A business rule generally refers to a rule that is applied to data in order to make a determination.

Techniques described herein constitute an improvement with respect to conventional practices, such as manually retrieving items of data from documents or requiring all documents to support queries for items of data, as they allow for efficient retrieval of data from documents that do not support queries. In a test case, techniques described herein were able to complete a data retrieval task from a large number of documents in fifteen minutes whereas the same data retrieval using conventional methods took a month to complete. Further, using a region definition to retrieve an item of data from documents via trees generated based on the documents allows for the item of data to be automatically retrieved from a plurality of documents despite small variations in the placement of the item of data in the documents and despite the documents not inherently supporting queries for the item of data. Embodiments of the present disclosure provide an automated solution not previously performable by a computer that saves a substantial amount of time and resources by avoiding time-consuming processes involving the manual retrieval of data from flat documents.

Example Solution for Improved Retrieval of Data from Documents

FIG. 1 illustrates an example 100 of improved retrieval of data from documents. Example 100 includes a service 132 and a retrieval engine 130.

Service 120 may be a web application or some other software service that provides functionality related to retrieval of data from documents for consumers of the service 120. For example, service 120 may comprise a financial services application, such as a financial management or tax preparation application, which retrieves data from documents for use in providing financial services to customers.

Retrieval engine 130 may perform operations related to improved retrieval of data from documents. In certain embodiments, service 120 and retrieval engine 130 may be implemented together or as a plurality of local or remote components. For example, while depicted separately in example 100 for illustrative purposes, service 120 and retrieval engine 130 may be implemented as a single component in some embodiments.

Service 120 provides a document region definition 122 to retrieval engine 130. For example, document region definition 122 may comprise coordinates of a region relative to a location on a document page (e.g., the bottom left corner of the document page), which may have been defined by a user via a user interface. In certain embodiments, document region definition 122 is associated with an identifier that identifies an item of data associated with the region. Service 120 also provides a document 124 to retrieval engine 130. In certain embodiments, document 124 is a flat PDF that does not support queries for items of data within document 124. Document 124 may comprise one or more elements (e.g., words, lines, values, paragraphs, and/or other subsets of data within the document).

Retrieval engine 130 builds a tree based on document 124, such as by extracting the elements from document 124 (e.g., by identifying clusters of text) and storing each element in the tree along with location data of the element, such as coordinates of the element on a respective page of the document. After building the tree, retrieval engine 130 compares the location data of each element in the tree with the document region definition 122 to determine if the element falls within the region. If one or more elements fall with the region defined by document region definition 122, then retrieval engine 130 returns the one or more elements as data item 132. In certain embodiments retrieval engine 130 returns all elements in the tree that overlap with the region (e.g., all elements that have any contact with the region), while in other embodiments retrieval engine 130 only returns elements in the tree that are encompassed by (e.g., contained completely within) the region. It is noted that retrieval engine 130 may, in some instances, return a plurality of elements as data item 132. For example, if multiple elements fall within the region, then all of the multiple elements are returned together as the item of data.

Data item 132 may be used by service 120 in performing additional actions. For example, service 120 may apply one or more business rules (e.g., related to tax preparation) to data item 132 and populate a field of a separate document based on the results of applying the one or more business rules to data item 132. In certain embodiments, service 120 validates data item 132, such as through pattern matching, before performing additional actions.

While example 100 only depicts the retrieval of one data item 132 from one document 124, it is noted that techniques described herein may be used to retrieve items of data from a plurality of documents. For example, document region definition 122 may be associated with a particular type of document, and may be used by retrieval engine 130 to retrieve the item of data from a plurality of documents of the particular type, such as documents associated with different customers.

While certain embodiments described involve particular processes for identifying locations of elements in documents, such as converting documents to XML trees, it is noted that other techniques for identifying elements in documents may be used without departing from the scope herein.

Example User Interface for Improved Retrieval of Data from Documents

FIG. 2 depicts an example user interface 200 related to improved data retrieval from documents. For instance, user interface 200 may be associated with service 120 of FIG. 1.

User interface 200 includes a sample document 210 that comprises text related to tax withholdings. For example, sample document 200 may be representative of a plurality of system-generated tax withholding forms for a local municipality that are associated with a plurality of customers. A user, such as an agent of a company that provides a financial services application, accesses user interface 200 in order to perform activities related to retrieving an item of data from each of the plurality forms.

The user interacts with user interface 200 using cursor 212 to define a region 214. For example, the user may click and drag with cursor 212 to define region 214, which is a rectangular region that encompasses the item of data throughout the plurality of documents. In one example, the item of data is a customer address, and region 214 encompasses the portion of the page that includes a customer address on each of the plurality of documents. The user may have knowledge of the general location of the item of data across the plurality of documents, such as based on a review of the plurality of documents. As shown, region 214 on sample document 210 encompasses the text "ABC CORP," "123 BUSINESS LN," and "DALLAS, Tex. 75214," each of which is on a separate line. Because customer addresses vary in length, and because the process used to generate documents may produce slight variations in positioning (e.g., the blank line after "ABC CORP"), the user may look at each of the plurality of documents to determine the boundaries of a region that encompasses the customer address on all of the documents before defining region 214.

A region definition of region 214 is stored, comprising coordinates of region 214. For example, the coordinates may comprise X and Y values representing a number of pixels from the bottom left corner of sample document 210 to the bottom left corner and top right corner of region 214. In certain embodiments, the user may provide an identifier for region 214, such as "customer address", that identifies an item of data encompassed by the region. The identifier may be used to retrieve the definition of region 214 for use in retrieving the item of data from a document.

Example Data Structures for Improved Retrieval of Data from Documents

Figure 3:
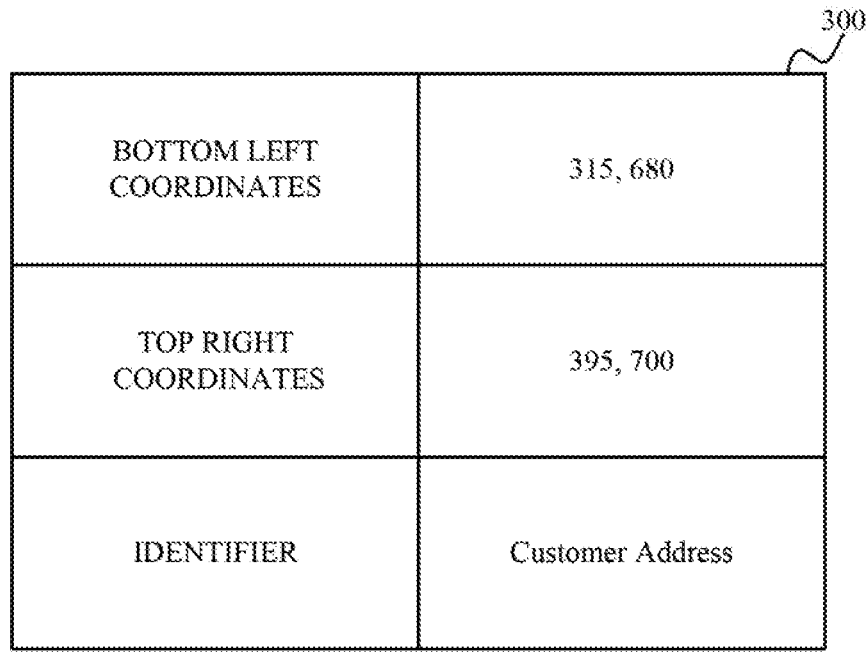
FIG. 3 depicts an example document region definition related to improved retrieval of data from documents.

FIG. 3 depicts an example document region definition 300 related to improved retrieval of data from documents. For example, document region definition 300 may be a definition of region 214 as shown and described with respect FIG. 2.

Document region definition 300 comprises bottom left coordinates and top right coordinates of a rectangular region associated with an item of data as well as an identifier of the item of data. The bottom left coordinates are "315, 680," indicating that the bottom left corner of the region is 315 pixels from the left side of the page and 680 pixels from the bottom of the page. The top right coordinates are "395, 700," indicating that the top right corner of the region is 396 pixels from the left side of the page and 700 pixels from the bottom of the page.

Document region definition 300 further comprises an identifier that identifies the item of data encompassed by the region. The identifier is "Customer Address", indicating that the region encompasses a customer address.

Document region definition 300 may be used to identify elements in a document that correspond to the item of data associated with the identifier "customer address". For example, a document may be converted into an element tree according to techniques described herein, and any elements that fall within the region defined by document region definition 300 may be retrieved as a customer address from the document.

Figure 4:
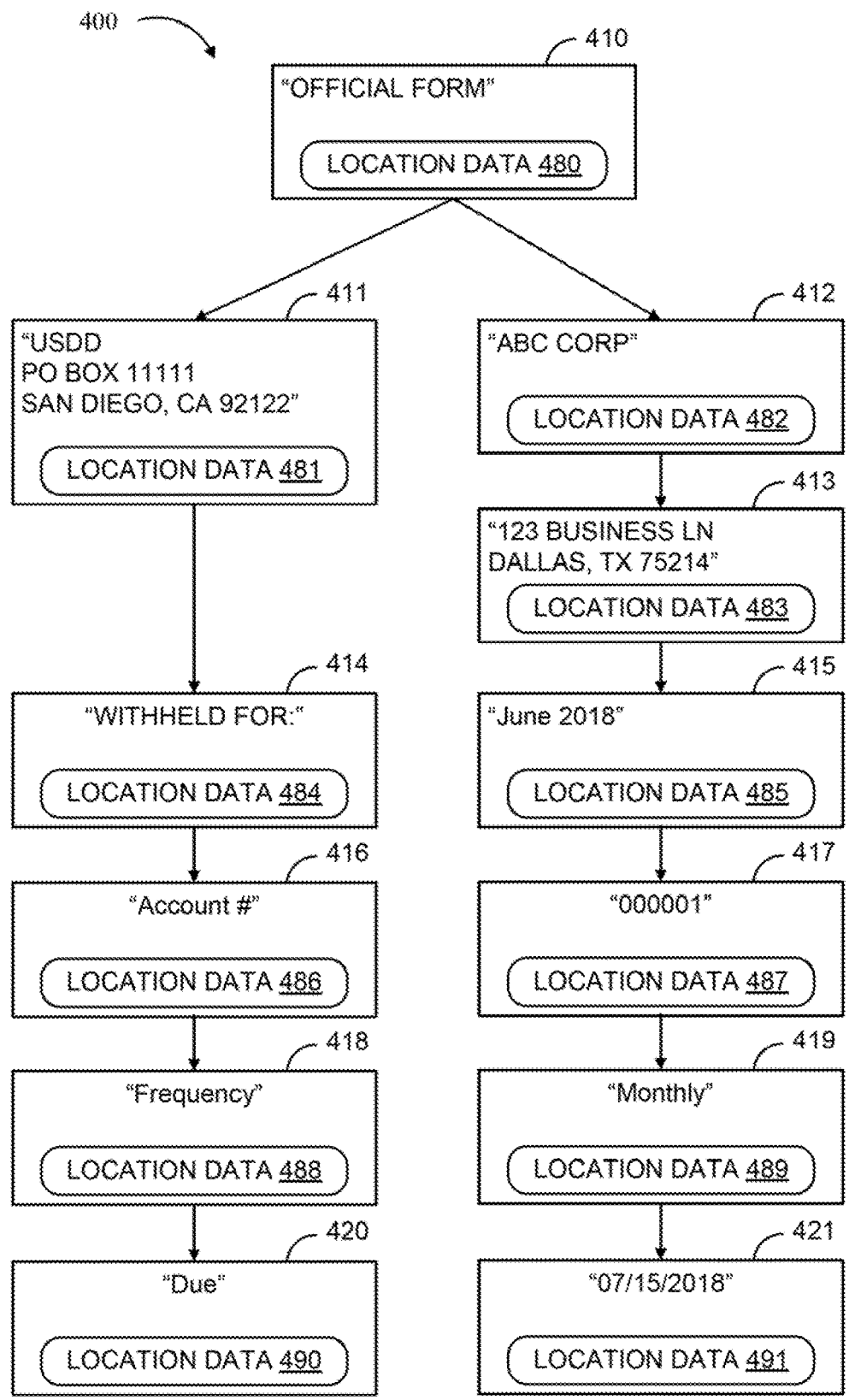
FIG. 4 depicts an example tree built from a document for improved retrieval of data from documents.

FIG. 4 depicts an example tree 400 built from a document for improved retrieval of data from documents. For example, tree 400 may be built by retrieval engine 130 as shown and described with respect to FIG. 1, and may be built based on sample document 200 as shown and described with respect to FIG. 2.

Tree 400 may be built by converting a document to a tree, such as an XML tree. For example, a document (e.g., sample document 200 of FIG. 2) may be provided to a retrieval engine (e.g., retrieval engine 130 of FIG. 1) in order to extract an item of data (e.g., a customer address) from the document. The retrieval engine converts the document to tree 400.

In some embodiments, tree 400 is an element tree that is generated using a tool such as PDFQuery and PyPDF (e.g., by extracting clusters of text from the document and storing each cluster of text as an element in the tree along with location data of the element). Elements 410-421 each represent a cluster of text identified in the document (e.g., using a clustering algorithm that identifies clusters of text likely to be a discrete element, such as an address, based on proximity). It is noted that tree 400 only represents a portion of the text in sample document 200 of FIG. 2 for illustrative purposes, and the entire text of the document may be included in the tree. Furthermore, the layout of tree 400 (e.g., the separation of text into elements and the connections between elements) is only one example, and different layouts are possible. Furthermore, the branching of tree 400 is only depicted for illustrative purposes, and other branching patterns may be used. The branching of tree 400 as depicted is based on locations of text in sample document 200. Because "OFFICIAL FORM" is in the center of the top of the page and the rest of the elements fall to the left or right of the page beneath "OFFICIAL FORM", element 410 branches into elements 411, 414, 416, 418, and 420 on the left and 412, 413, 415, 417, 419, and 421 on the right.

Each of elements 410-421 comprises location data 480-491. Location data 480-491 may each comprise exact coordinates of the cluster of text associated with each respective element 410-421 relative to the bottom left corner of the page. Coordinates of clusters of text generally define rectangles, as text is generally printed in a linear fashion within documents. In some embodiments, however, elements may include location data that defines shapes other than rectangles (e.g., circular regions defined by coordinates of the center of the circle and a radius of the circle, or more complex regions defined by polygons).

Tree 400 may be used to retrieve an item of data from the document. For example, document region definition 300 of FIG. 3 may be used in conjunction with tree 400 to retrieve a customer address from the document. In one example, the location data 480-491 of each element 410-421 is compared to the coordinates of document region definition 300 to determine if the element is encompassed by the region. Elements 412 and 413 are identified as falling inside the region, and are retrieved as the customer address. In certain embodiments, elements 412 and 413 are compared to a pattern for validation purposes after being retrieved.

Example Method for Improved Retrieval of Data from Documents

Figure 5:
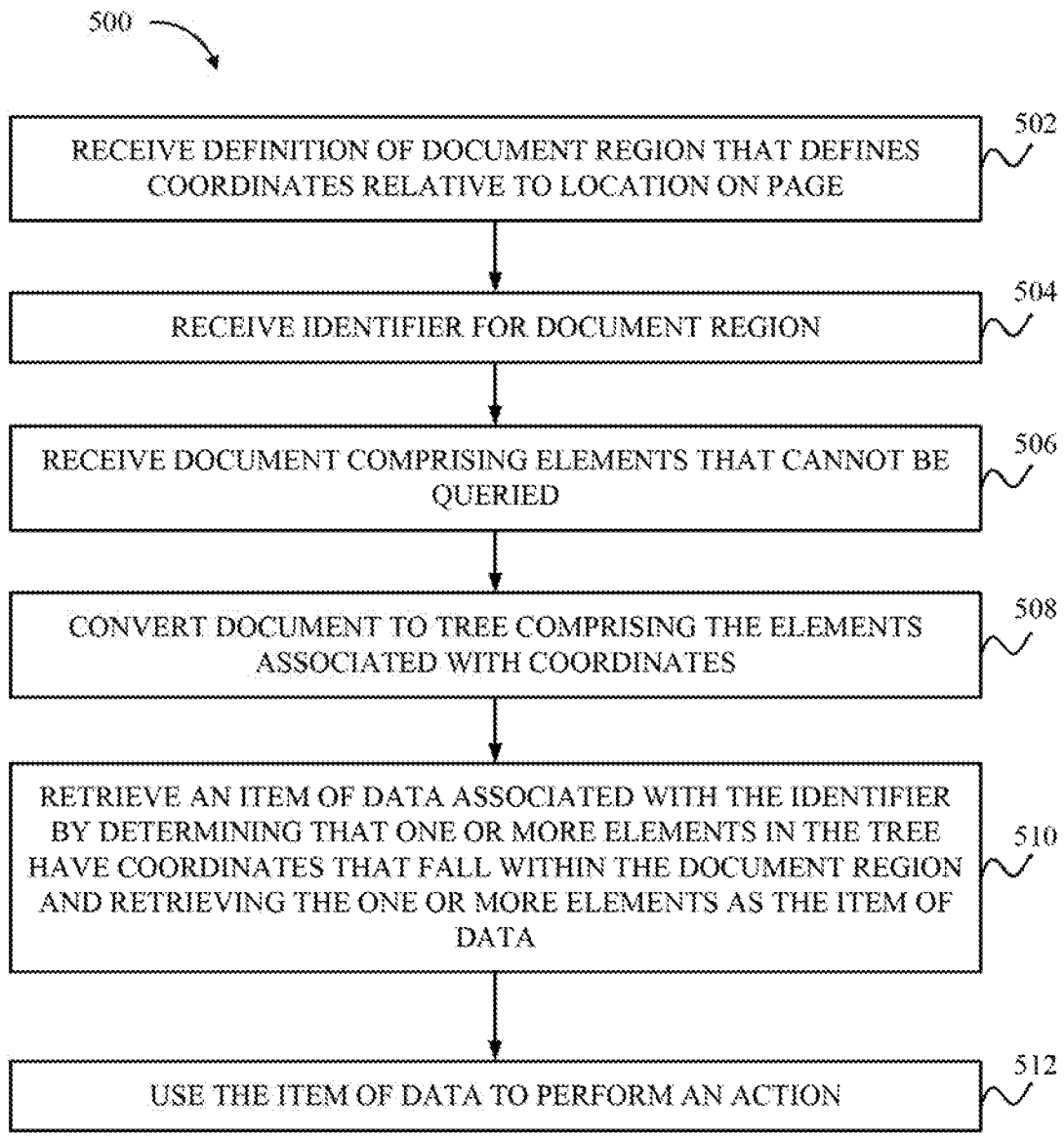
FIG. 5 depicts example operations for improved retrieval of data from documents.

FIG. 5 depicts example operations 500 for improved retrieval of data from documents. For example, operations 500 may be performed by service 120 and/or retrieval engine 130 as shown and described with respect to FIG. 1.

At step 502, a definition of a document region that defines coordinates relative to a location on a page is received. For example, a user may define a document region via a user interface by clicking a dragging to create a box (e.g., region 214 of FIG. 2). The definition of the document region (e.g., document region definition 300 of FIG. 3) may comprise the coordinates of the bottom left corner and top right corner of the box defined by the user relative to the bottom left corner of the page.

At step 504, an identifier for the document region is received. For example, the identifier may be provided by the user, and may identify an item of data associated with or encompassed by the document region, such as in a plurality of documents of a particular type.

At step 506, a document comprising elements that cannot be queried is received. For example, the document may be one of a plurality of documents of a particular type from which an item of data is to be retrieved. In one example, the document is a flat PDF document. The elements may comprise clusters of text.

At step 508, the document is converted to a tree comprising elements associated with coordinates. For example, the tree may be built by identifying clusters of text in the document and storing each cluster of text as an element in the tree in association with location data that identifies coordinates of the cluster of text relative to a location on the page (e.g., the bottom left corner of the page).

At step 510, an item of data associated with the identifier is retrieved from the document by determining that one or more elements in the tree have coordinates that fall within the document region and retrieving the one or more elements as the item of data. For example, the coordinates from the location data of each element in the tree may be compared to the coordinates in the definition of the document region, and each element that has coordinates within the document region may be retrieved as the item of data. In certain embodiments all elements that overlap with the document region are retrieved as the item of data, while in other embodiments only elements that are encompassed by the document region are retrieved as the item of data. In some cases, a plurality of elements may be returned as the item of data. In some embodiments, the item of data is validated, such as through pattern matching, after it is retrieved.

At step 512, the item of data is used to perform an action. For example, the item of data may relate to taxes, and business rules related to tax law may be applied to the item of data in order to populate a field of a tax form that is different from the document. In one example, a business rule may indicate that a certain type of income is subject to a particular tax rate within a local municipality. The item of data may include information about the certain type of income for a particular customer, and applying the business rule to the item of data may involve applying the tax rate to the income included in the item of data. The result of applying the tax rate to the income is then used to populate a field in a tax form, such as a "tax owed" field.

In certain embodiments, steps 506-512 may be performed for a plurality of documents of a particular document type using the definition and identifier of the document region received at steps 502 and 504. As such, the item of data may be efficiently retrieved from a plurality of documents without requiring the user to manually retrieve the item of data from each document. Furthermore, different definitions of different document regions may be defined for different items of data so that a plurality of items of data may be efficiently retrieved from the plurality of documents.

It is noted that operations 500 are only included as an example, and other sets of operations may be performed without departing from the scope of the present disclosure.

Example Computing System for Improved Retrieval of Data from Documents

Figure 6:
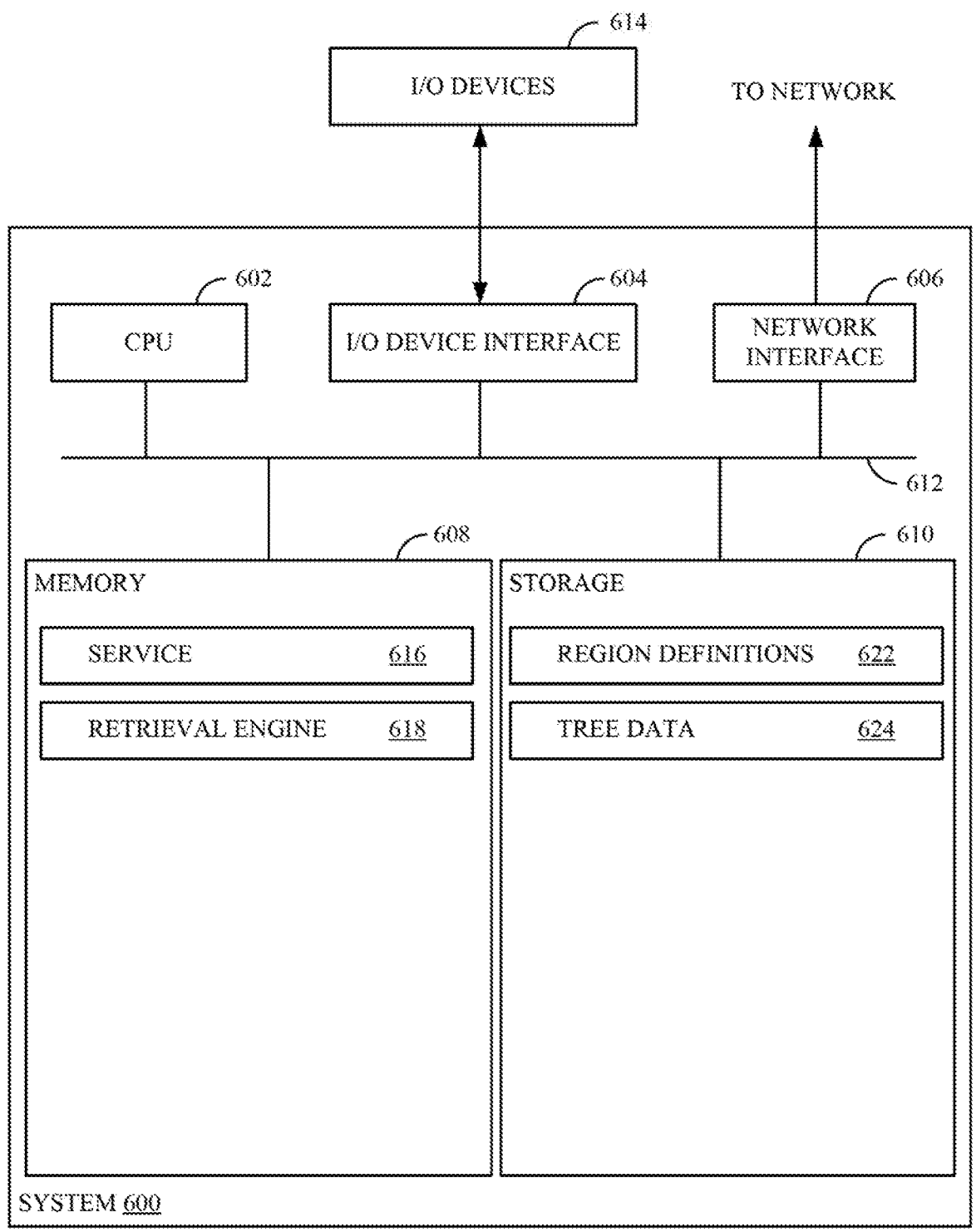
FIG. 6 depicts an example computer system with which embodiments of the present disclosure may be implemented.

FIG. 6 illustrates an example system 600 used for retrieval of data from documents.

As shown, system 600 includes a central processing unit (CPU) 602, one or more I/O device interfaces 604 that may allow for the connection of various I/O devices 614 (e.g., keyboards, displays, mouse devices, pen input, etc.) to the system 600, network interface 606, a memory 608, storage 610, and an interconnect 612. It is contemplated that one or more components of system 600 may be located remotely and accessed via a network. It is further contemplated that one or more components of system 600 may comprise physical components or virtualized components.

CPU 602 may retrieve and execute programming instructions stored in the memory 508. Similarly, the CPU 602 may retrieve and store application data residing in the memory 608. The interconnect 612 transmits programming instructions and application data, among the CPU 602, I/O device interface 604, network interface 606, memory 608, and storage 610. CPU 602 is included to be representative of a single CPU, multiple CPUs, a single CPU having multiple processing cores, and/or other arrangements of processing components. Additionally, the memory 608 is included to be representative of a random access memory. Furthermore, the storage 610 may be a disk drive, solid state drive, or a collection of storage devices distributed across multiple storage systems. Although shown as a single unit, the storage 610 may be a combination of fixed and/or removable storage devices, such as fixed disc drives, removable memory cards or optical storage, network attached storage (NAS), or a storage area-network (SAN).

Storage 610 comprises region definitions 622 and tree data 624. For example, region definitions 622 may comprise definitions (e.g., document region definition 300 of FIG. 3) of document regions associated with items of data according to techniques described herein. Tree data 624 may comprise trees built based on documents (e.g., tree 400 of FIG. 4) according to techniques described herein.

As shown, memory 608 includes service 616 and retrieval engine 618, which may be representative of service 120 and retrieval engine 130 of FIG. 1. For example, service 616 and retrieval engine 618 may be perform operations related to improved retrieval of data from documents (e.g., as described with respect to FIGS. 1-5) using region definitions 622 and tree data 624.

The preceding description provides examples, and is not limiting of the scope, applicability, or embodiments set forth in the claims. The preceding description is provided to enable any person skilled in the art to practice the various embodiments described herein. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for improved retrieval of data from documents, comprising:
   receiving, from a user at a user interface, a definition of a document region on a document page, wherein the definition comprises coordinates relative to a location on the document page;
   after receiving the definition, receiving, at the user interface, text input typed by the user defining an identifier associated with the document region;
   receiving a plurality of system-generated documents of a given type, wherein a location of a given item of data varies among the plurality of system-generated documents, wherein the document region encompasses the location of the given item of data in each of the plurality of system-generated documents, wherein each document of the plurality of system-generated documents comprises a set of elements, and wherein each document of the plurality of system-generated documents is a flat document that does not support queries for the set of elements; and
   for each given document of the plurality of system-generated documents:
      building a tree based on the given document, wherein the tree comprises the set of elements, and wherein each element of the set of elements is associated in the tree with element coordinates defining a location of the element on a page of the given document;
      retrieving the given item of data associated with the identifier by:
         determining that the element coordinates of at least two elements of the set of elements in the tree are within the document region associated with the identifier;
         determining that the given item of data comprises the at least two elements by validating that the at least two elements match a pattern to which the given item of data is expected to conform; and
         retrieving, in response to the validating, only the at least two elements together as the given item of data; and
      using the given item of data to perform an action.

2. The method of claim 1, wherein receiving, from the user, the definition of the document region comprises receiving input from the user via the user interface, wherein the input defines the document region.

3. The method of claim 1, wherein determining that the element coordinates of the at least two elements are within the document region associated with the identifier comprises determining either that the element coordinates overlap with the document region or that the element coordinates are encompassed by the document region.

4. The method of claim 1, wherein the definition of the document region is associated with a document type, and wherein each document of the plurality of system-generated documents is of the document type.

5. The method of claim 1, wherein performing the action comprises automatically populating a field of a second document based on the given item of data.

6. The method of claim 5, wherein automatically populating the field of the second document based on the given item of data comprises:
   applying a business rule to the given item of data; and
   populating the field based on a result of applying the business rule to the given item of data.

7. The method of claim 1, wherein the definition of the document region defines one of:
   a rectangular region; or
   a circular region defined by coordinates of a center of a circle and a radius of the circle.

8. A non-transitory computer-readable medium comprising instructions that, when executed by one or more processors, cause the one or more processors to perform a method for improved retrieval of data from documents, the method comprising:
   receiving, from a user at a user interface, a definition of a document region on a document page, wherein the definition comprises coordinates relative to a location on the document page;
   after receiving the definition receiving, at the user interface, text input typed by the user defining an identifier associated with the document region;
   receiving a plurality of system-generated documents of a given type, wherein a location of a given item of data varies among the plurality of system-generated documents, wherein the document region encompasses the location of the given item of data in each of the plurality of system-generated documents, wherein each document of the plurality of system-generated documents comprises a set of elements, and wherein each document of the plurality of system-generated documents is a flat document that does not support queries for the set of elements; and
   for each given document of the plurality of system-generated documents:
      building a tree based on the given document, wherein the tree comprises the set of elements, and wherein each element of the set of elements is associated in the tree with element coordinates defining a location of the element on a page of the given document;
      retrieving the given item of data associated with the identifier by:
         determining that the element coordinates of at least two elements of the set of elements in the tree are within the document region associated with the identifier;
         determining that the given item of data comprises the at least two elements by validating that the at least two elements match a pattern to which the given item of data is expected to conform; and
         retrieving, in response to the validating, only the at least two elements together as the given item of data; and
      using the given item of data to perform an action.

9. The non-transitory computer-readable medium of claim 8, wherein receiving, from the user, the definition of the document region comprises receiving input from the user via the user interface, wherein the input defines the document region.

10. The non-transitory computer-readable medium of claim 8, wherein determining that the element coordinates of the at least two elements are within the document region associated with the identifier comprises determining either that the element coordinates overlap with the document region or that the element coordinates are encompassed by the document region.

11. The non-transitory computer-readable medium of claim 8, wherein the definition of the document region is associated with a document type, and wherein each document of the plurality of system-generated documents is of the document type.

12. The non-transitory computer-readable medium of claim 8, wherein performing the action comprises automatically populating a field of a second document based on the given item of data.

13. The non-transitory computer-readable medium of claim 12, wherein automatically populating the field of the second document based on the given item of data comprises:
   applying a business rule to the given item of data; and
   populating the field based on a result of applying the business rule to the given item of data.

14. The non-transitory computer-readable medium of claim 8, wherein the definition of the document region defines one of:
   a rectangular region; or
   a circular region defined by coordinates of a center of a circle and a radius of the circle.

15. A system, comprising one or more processors and a non-transitory computer-readable medium comprising instructions that, when executed by the one or more processors, cause the one or more processors to perform a method for improved retrieval of data from documents, the method comprising:
   receiving, from a user at a user interface, a definition of a document region on a document page, wherein the definition comprises coordinates relative to a location on the document page;
   after receiving the definition, receiving, at the user interface, text input typed by the user defining an identifier associated with the document region;
   receiving a plurality of system-generated documents of a given type, wherein a location of a given item of data varies among the plurality of system-generated documents, wherein the document region encompasses the location of the given item of data in each of the plurality of system-generated documents, wherein each document of the plurality of system-generated documents comprises a set of elements, and wherein each document of the plurality of system-generated documents is a flat document that does not support queries for the set of elements; and
   for each given document of the plurality of system-generated documents:
      building a tree based on the given document, wherein the tree comprises the set of elements, and wherein each element of the set of elements is associated in the tree with element coordinates defining a location of the element on a page of the given document;
      retrieving the given item of data associated with the identifier by:
         determining that the element coordinates of at least two elements of the set of elements in the tree are within the document region associated with the identifier;
         determining that the given item of data comprises the at least two elements by validating that the at least two elements matches a pattern to which the given item of data is expected to conform; and
         retrieving, in response to the validating, only the at least two elements as the given item of data; and
      using the given item of data to perform an action.

16. The system of claim 15, wherein receiving, from the user, the definition of the document region comprises receiving input from the user via ithe user interface, wherein the input defines the document region.

17. The system of claim 15, wherein determining that the element coordinates of the at least two elements are within the document region associated with the identifier comprises determining either that the element coordinates overlap with the document region or that the element coordinates are encompassed by the document region.

18. The system of claim 15, wherein the definition of the document region is associated with a document type, and wherein each document of the plurality of system-generated documents is of the document type.

19. The system of claim 15, wherein performing the action comprises automatically populating a field of a second document based on the given item of data.

20. The system of claim 19, wherein automatically populating the field of the second document based on the given item of data comprises:
   applying a business rule to the given item of data; and
   populating the field based on a result of applying the business rule to the given item of data.

21. The system of claim 15, wherein the definition of the document region defines one of:
   a rectangular region; or
   a circular region defined by coordinates of a center of a circle and a radius of the circle.

\* \* \* \* \*